United States Patent
Nagata et al.

(10) Patent No.: US 7,145,702 B2
(45) Date of Patent: Dec. 5, 2006

(54) IMAGE PROCESSING METHOD

(75) Inventors: Yuko Nagata, Mishima (JP); Hidehiro Watanabe, Tokyo (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 995 days.

(21) Appl. No.: 10/100,626

(22) Filed: Mar. 18, 2002

(65) Prior Publication Data
US 2002/0171882 A1 Nov. 21, 2002

(30) Foreign Application Priority Data
May 16, 2001 (JP) .............................. 2001-146715

(51) Int. Cl.
*G03F 3/08* (2006.01)
(52) U.S. Cl. ...................... 358/521; 358/1.9; 358/3.03; 358/3.05; 358/3.02; 358/3.06; 358/3.12; 358/534; 358/536; 358/535; 382/237; 382/252; 382/274
(58) Field of Classification Search .................. 358/1.9, 358/3.03, 3.05, 3.1, 3.13, 3.14, 3.16, 3.21, 358/3.22, 521, 523, 3.02, 3.06, 3.12, 534, 358/535, 536; 382/237, 252, 274
See application file for complete search history.

(56) References Cited

U.S. PATENT DOCUMENTS

| | | | |
|---|---|---|---|
| 3,681,650 A | 8/1972 | Koll | |
| 4,680,645 A | 7/1987 | Dispoto et al. | |
| 5,191,444 A * | 3/1993 | Harada et al. | 358/3.21 |
| 5,539,667 A | 7/1996 | Rode | |
| 5,586,203 A | 12/1996 | Spaulding et al. | |
| 5,708,514 A | 1/1998 | Higuchi et al. | |
| 5,809,177 A | 9/1998 | Metcalfe et al. | |
| 5,835,238 A | 11/1998 | Mantell | |
| 6,292,268 B1 * | 9/2001 | Hirota et al. | 358/3.03 |
| 2002/0039199 A1 * | 4/2002 | Nose et al. | 358/3.03 |

FOREIGN PATENT DOCUMENTS

| | | |
|---|---|---|
| JP | 08-125860 A | 5/1996 |
| JP | 10-084478 A | 3/1998 |
| JP | 2000-333007 A | 11/2000 |

* cited by examiner

*Primary Examiner*—David Moore
*Assistant Examiner*—Michael Burleson
(74) *Attorney, Agent, or Firm*—Frishauf, Holtz, Goodman & Chick, P.C.

(57) ABSTRACT

An image data of M-gradations in a pixel is converted into multivalued image data of N-gradations (M>N>2) in a pixel. A remarked pixel converted into the multivalued data is determined whether to be a predetermined gradation TJ (N>TJ>2) in which a tone jump occurs. When the remarked pixel converted into the multivalued data is determined to be the predetermined gradation TJ, it is determined whether a pixel of the predetermined gradation TJ exists in pixels being adjacent to the remarked pixel. When the pixel of the predetermined gradation exists, the gradation of the remarked pixel is changed to the gradation other than the predetermined gradation so as to prevent the tone jump, and an average density after multivalued image data conversion is preserved.

17 Claims, 9 Drawing Sheets

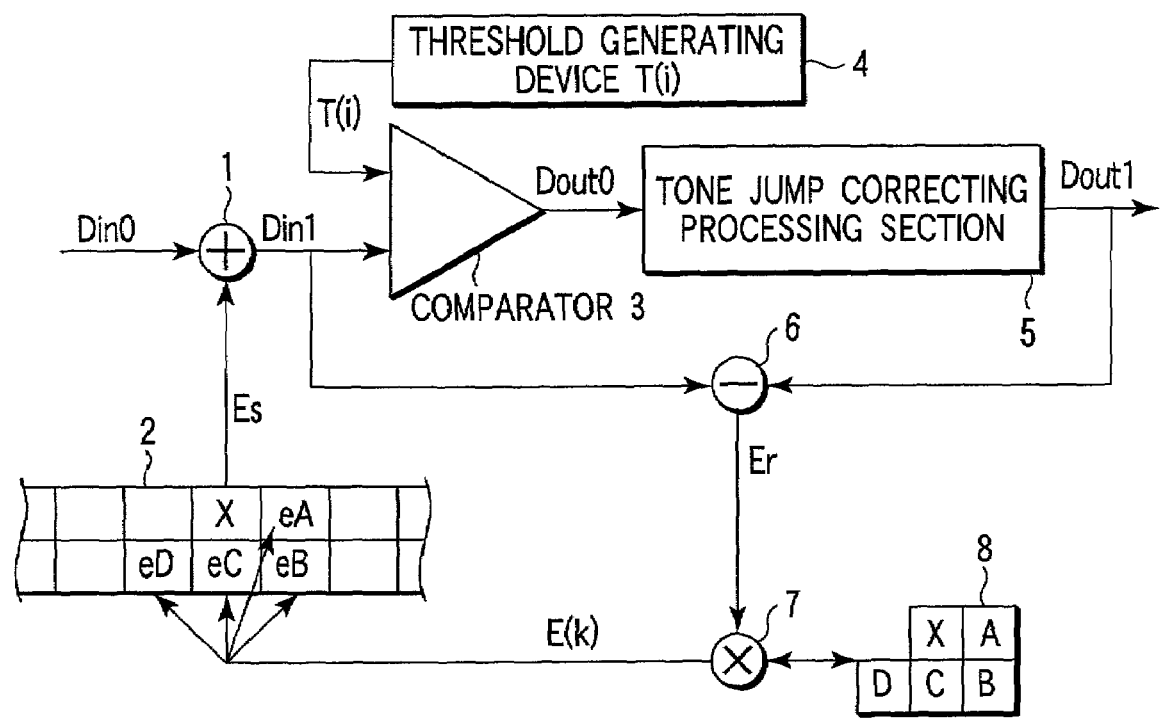
F I G. 1

| PREDETERMINED GRADATION TJ FOR INK A | | IMAGE RESOLUTION [dpi] | | |
|---|---|---|---|---|
| | | 150 | 300 | 600 |
| RECORDING MEDIUM | PLAIN PAPER | 6 | 2 | 0 |
| | DEDICATED PAPER | 8 | 4 | 0 |
| | GLOSSY PAPER | 12 | 5 | 2 |
| MAXIMUM GRADATION | | 15 | 7 | 3 |

FIG. 3A

| PREDETERMINED GRADATION TJ FOR INK B | | IMAGE RESOLUTION [dpi] | | |
|---|---|---|---|---|
| | | 150 | 300 | 600 |
| RECORDING MEDIUM | PLAIN PAPER | 4 | 0 | 0 |
| | DEDICATED PAPER | 6 | 3 | 0 |
| | GLOSSY PAPER | 10 | 4 | 2 |
| MAXIMUM GRADATION | | 15 | 7 | 3 |

| 5 | 4 | 5 | 8 |
|---|---|---|---|
| 6 | 6 | 7 | 9 |
| 7 | 7 | 8 | 12 |
| 8 | 9 | 9 | 13 |

| 14 | 10 | 6 | 15 |
|----|----|---|----|
| 5  | 1  | 2 | 11 |
| 9  | 4  | 3 | 7  |
| 13 | 8  | 12| 16 | h × h

FIG. 7C

| 0 | 0 | 0 | 0 |
|---|---|---|---|
| 1 | 1 | 1 | 0 |
| 0 | 1 | 1 | 1 |
| 0 | 1 | 0 | 0 |

| PREDETERMINED GRADATION TJ | | IMAGE RESOLUTION [dpi] | | |
|---|---|---|---|---|
| | | 150 | 300 | 600 |
| RECORDING MEDIUM | PLAIN PAPER | 6 | 2 | 0 |
| | DEDICATED PAPER | 8 | 4 | 0 |
| | GLOSSY PAPER | 12 | 5 | 2 |
| MAXIMUM GRADATION | | 15 | 7 | 3 |

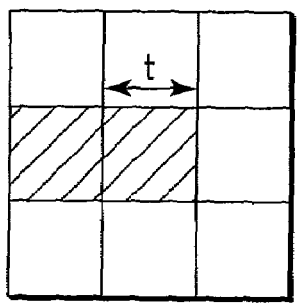 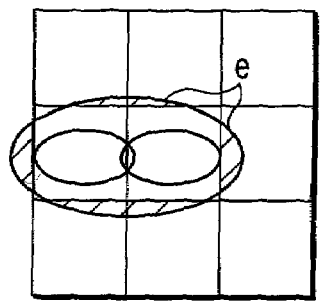 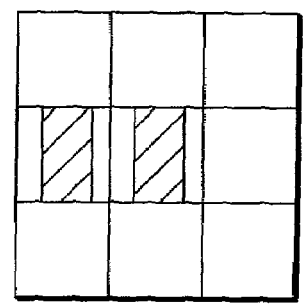

| EXISTENCE OF DOT IN SURROUNDING EIGHT PIXELS | PRESENCE OR ABSENCE OF CORRECTION | NONE RATE OF CHANGE IN DRIVING PULSE WIDTH |
|---|---|---|
| NO DOT IN SURROUNDING EIGHT PIXELS | INCREASE | +20% |
| ONE EXISTS IN A DIAGONAL DIRECTION | DECREASE | −10% |
| ONE EXISTS IN EITHER LEFT OR RIGHT PIXEL | NONE | ±0% |
| ONE EXISTS IN EITHER ABOVE OR BELOW PIXEL | INCREASE | +10% |
| TWO EXISTS IN A DIAGONAL DIRECTION | DECREASE | −20% |
| TWO EXISTS IN EITHER ABOVE OR RIGHT PIXEL | DECREASE | −10% |
| TWO EXISTS IN EITHER ABOVE OR BELOW PIXEL | NONE | ±0% |
| A CASE OTHER THAN TH ABOVE | NONE | ±0% |

FIG. 14 PRIOR ART

IMAGE PROCESSING METHOD

CROSS-REFERENCE TO RELATED APPLICATIONS

This application is based upon and claims the benefit of priority from the prior Japanese Patent Application No. 2001-146715, filed May 16, 2001, the entire contents of which are incorporated herein by reference.

BACKGROUND OF THE INVENTION

1. Field of the Invention

The present invention relates to an image processing method of converting input image data of M-gradations in a pixel into multivalued image data of N-gradations (M>N>2) in a pixel by a pseudo half tone processing.

2. Description of the Related Art

In an image forming apparatus such as a printer, copying machine or the like, an image processing of converting multivalued input image data into a binary or multivalued image signal is carried out. As such an image processing, an error diffusion method that has excellent gradation reproducibility and high resolution, for example, is known. A case where a binary processing is performed with use of the error diffusion method will be described, for example. A binarized pixel distributes the result obtained by multiplying a binary error generated in the binary processing by a certain weighting factor to surrounding pixels. Then, a binary processing is performed to an input remarked pixel by adding the entire errors distributed to the remarked pixel and using a threshold.

Note that, when a multivalued processing more than a ternary processing is performed, the processing is carried out with use of a plurality of thresholds that corresponds to the multivalue.

By performing the binary processing or multivalued processing to the input image with use of the error diffusion method, an average density can be theoretically preserved.

However, even in the image processing using such error diffusion method, when overall printing, which is a moderate gradation or a solid color, is performed, dots having the same number of gradations may be formed adjacently to one another.

On the other hand, a dot to be practically printed has a shape different from rectangular one that is theoretically considered. For example, an eight-valued case for an ink jet printer is considered. As shown in FIG. 11, practical dots are reproduced using variable dot sizes of seven kinds for one pixel. In general, the size of each dot in each gradation is adjusted in advance to have a linear characteristic etc. in density. However, when pixels having fifth-gradations are printed successively, it is desirable that edges of the dots are secured as shown with H in FIG. 12. In a practical case, the adjacent dots are associated with each other as shown with I in FIG. 12. With the influence of the association, a dot area increases remarkably. That is, a surplus area d is generated owing to the association, and the density increases rapidly. A phenomenon such that a rapid change in density occurs in a case where the specific numbers of gradation are adjacent to each other is referred to as a tone jump. The phenomenon occurs not only in an ink jet printer but also in the other image forming apparatuses.

Therefore, in the Jpn. Pat. Appln. KOKAI Publication No. 2000-333007 for example, input image data are processed by the error diffusion method. After the processing, by applying correction to reduce the dot area of the remarked pixel with use of the peripheral dot information, the association of dots is prevented from occurring. More specifically, assume that output image shown in FIG. 13A is required. When data after an error diffusion processing are output data themselves as shown in FIG. 13A, an area surplus e occurs as shown in FIG. 13B. It is checked whether a dot exists in eight pixels surrounding the remarked pixel. Then, the correction as shown in FIG. 13C is performed following correction regulations shown in FIG. 14 against the remarked pixel and its surroundings, thereby preventing an influence from the area surplus.

There are two problems in the image processing method disclosed in the Jpn. Pat. Appln. KOKAI Publication No. 2000-333007. One problem is such that the correction is carried out after the error diffusion processing, so the average density cannot be preserved. The other problem is that compatibility between a recording medium and ink, such as bleeding etc., is not considered, so it is not possible to deal with changes of recording medium. The second problem is not a problem in a case using a single recording medium. However, in a practical case of an image forming apparatus that performs printing on recording media of various kinds, a predetermined gradation, in which the tone jump occurs when the identical gradations are adjacent to each other owing to characteristics of recording medium and ink, is changed. The method cannot deal with such a change of the predetermined gradation.

Accordingly, an object of the present invention is to provide an image processing method that enables avoidance of the tone jump owing to the area increase caused by dot association and preservation of the average density after converting into multivalued image data.

BRIEF SUMMARY OF THE INVENTION

According to the embodiments of the invention, an image data of M-gradations in a pixel is converted into multivalued image data of N-gradations (M>N>2) in a pixel. A remarked pixel converted into the multivalued data is determined whether to be a predetermined gradation TJ (N>TJ>2) in which a tone jump occurs. When the remarked pixel converted into the multivalued data is determined to be the predetermined gradation TJ, it is determined whether a pixel of the predetermined gradation TJ exists in pixels being adjacent to the remarked pixel. When the pixel of the predetermined gradation exists, the gradation of the remarked pixel is changed to the gradation other than the predetermined gradation so as to prevent the tone jump, and an average density after multivalued image data conversion is preserved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a first embodiment according to the present invention;

FIG. 2 is a block diagram showing a configuration of a tone jump correction processing section according to the first embodiment;

FIGS. 3A and 3B are diagrams, each showing a construction of a predetermined gradation setting value storage section in the tone jump correction processing section according to the first embodiment;

FIGS. 7A to 7C are diagrams, each for explaining a basic processing of a dither method that is applied to the second embodiment;

FIGS. 13A, 13B and 13C are diagrams for explaining a prior art; and

FIG. 14 is a diagram for explaining the prior art.

DETAILED DESCRIPTION OF THE INVENTION

Figure 4:
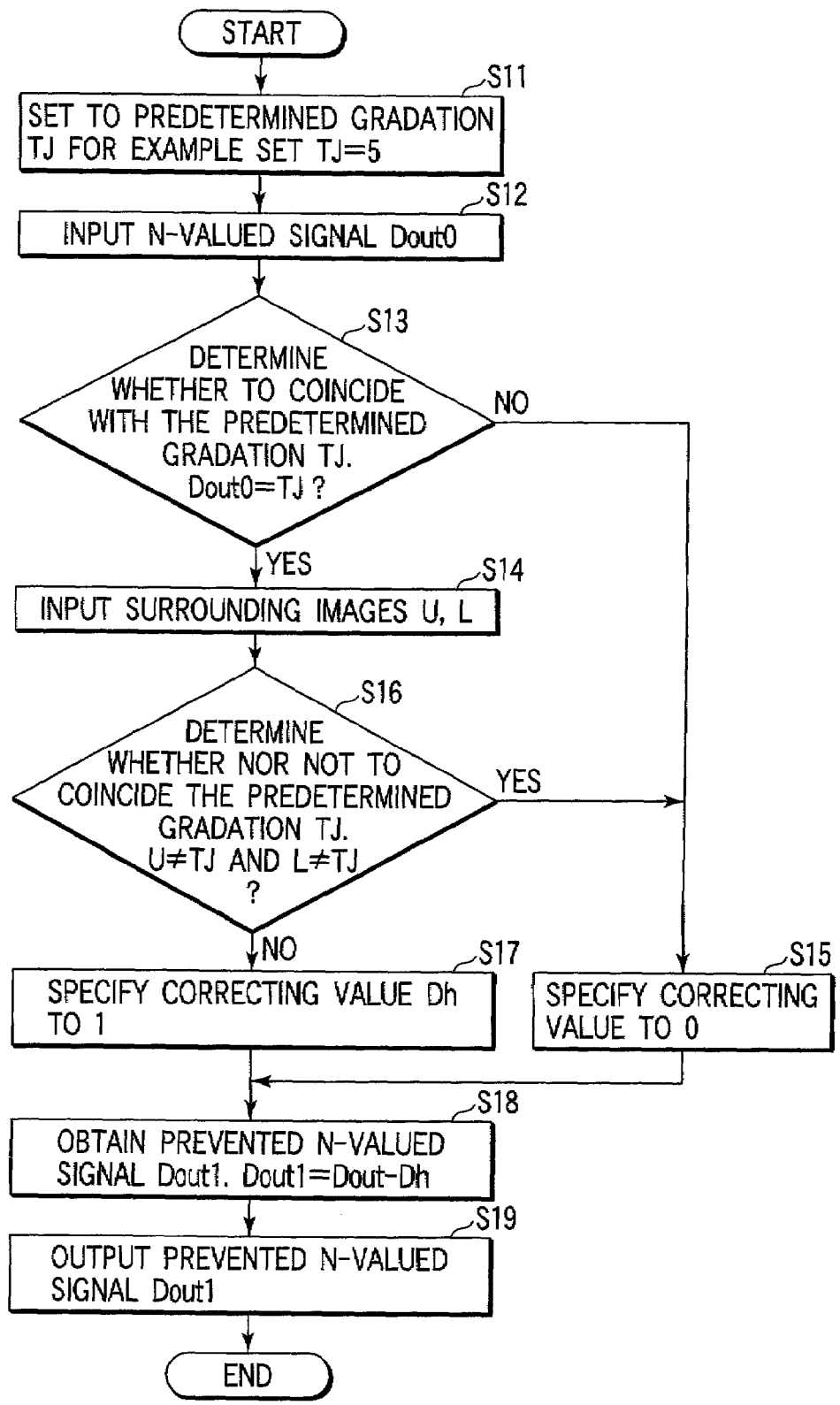
FIG. 4 is a flow chart showing processes in a tone jump correction processing section according to the first embodiment.

Embodiments of the present invention now will be described with reference to the accompanying drawings, hereinafter.

(First Embodiment)

This embodiment is described about an image processing method of converting an input image signal of M-gradations into an image signal of N (M>N>2)-gradations through an error diffusion processing.

FIG. 1 is a block diagram showing the entire construction. In FIG. 1, an input image signal Din0 of M-gradations is supplied to an input image signal correcting section 1. The input image signal correcting section 1 adds a remarked image accumulated error Es supplied from an accumulated error storage section 2 to the input image signal Din0, and outputs a corrected image signal Din1.

The corrected image signal Din1 outputted from the input image signal correcting section 1 is supplied to a comparator 3. The numeral 4 denotes a threshold generating device that generates thresholds T(i) to the number of (N−1), which are necessary for N-valuing. The threshold generating device 4 supplies the thresholds T(i) to the comparator 3. Note that i is a natural number satisfying $1 \leq i \leq (N-1)$.

The comparator 3 compares the corrected image signal Din1 with the thresholds T(i) and outputs a N-valued signal Dout0. More specifically, when $T(i) \leq Din1 < T(i+1)$ (provided that i is a natural number satisfying $1 \leq i \leq (N-2)$) stands satisfied, the comparator 3 outputs Dout0=i; when Din1<T(1), Dout0=0; and T (N−1)≦Din1, Dout0=(N−1).

The N-valued signal Dout0 outputted from the comparator 3 is supplied to a tone jump correcting processing section 5. The tone jump correcting processing section 5 performs a correcting process to the N-valued signal Dout0 at a predetermined gradation TJ where a tone jump is caused to the N-valued signal Dout0 at the time when corrected image signals surrounding the signal Dout0 are also in the predetermined gradation TJ, and outputs a N-valued signal Dout1 with the tone jump prevented.

The numeral 6 denotes a N-valued error calculating section. The N-valued error calculating section 6 calculates the difference between the corrected image signal Din1 and a converted value of the N-valued signal Dout1, which is obtained by converting the signal Dout1 with the tone jump prevented to an input image signal valued, as an N-valued error Er with the tone jump prevented. The N-valued error calculating section 6 then outputs the error Er to a diffusion error calculating section 7. Note that, the process of converting the N-valued signal Dout1 with the tone jump prevented to a input image signal level means a conversion of the N-valued signal Dout1 having a value in the range of 0 to (N−1) with the tone jump prevented to a value in the range of 0 to the input image signal maximum value Dmax. The value after the conversion becomes Dout1×Dmax/(N−1).

The numeral 8 denotes a diffusion coefficient storage section that stores diffusion coefficients (weighting coefficients) A, B, C and D for calculating a diffusion error E(i). The diffusion error calculating section 7 reads out the diffusion coefficients A, B, C and D from the diffusion coefficient storage section 8 and multiplies the respective coefficients by the N-valued error Er with the tone jump prevented, independently. After that, the diffusion error calculating section 7 calculates a diffusion error E(k) against positions of surrounding pixels with the prevented N-valued error Er assumed as a remarked pixel X. Note that k is a natural number satisfying $1 \leq k \leq 4$. In addition, the weighting coefficients A, B, C and D are set such that the total sum of these coefficients becomes 1, for example, A=7/16, B=1/16, C=5/16 and D=3/16.

The diffusion errors E(k) in the four pixels surrounding the remarked pixel X, which has been calculated by the diffusion error calculating section 7, is stored cumulatively at corresponding places in the accumulated error storage section 2. More specifically, the accumulated error storage section 2 stores diffusion error accumulated values eA, eB, eC and eD of the respective pixels. The accumulated error storage section 2 is configured to output a remarked error accumulated error Es, which is the accumulation of diffusion errors generated in the four pixels surrounding the remarked pixel X (note that these four pixels have been multiplied to the N-valued.) to the input image signal correcting section 1.

An image processing device having the structure described above performs N-valuing to one remarked pixel and prevents a tone jump from occurring therein. By repeating this process, the entire input image signal can be N-valued and the tone jump can be prevented form occurring.

As shown in FIG. 2, the tone jump correcting processing section 5 has an error signal correcting section 11 to which the N-valued signal Dout0 supplied from the comparator 3 is input and a corrected N-valued signal storage section 12 that stores the corrected N-valued signal Dout1 with the tone jump prevented. The corrected N-valued signal storage section 12 has capacity to store the corrected N-valued signals Dout1 for two lines including the remarked pixel X and stores consecutively the signals for two lines, a line including pixels which is in a process and the preceding line.

In addition, the tone jump correcting processing section 5 has a correcting signal generating section 13 and a predetermined gradation setting value storage section 14. On receiving the N-valued remarked pixel X (=Din0), a pixel L on the left side of the remarked pixel X stored in the corrected N-valued signal storage section 12 and a pixel U immediately above the remarked pixel X, the correcting signal generating section 13 compares the respective pixels with a predetermined gradation TJ read out from the predetermined gradation setting value storage section 14, which causes the tone jump. Then the correcting signal generating section 13 outputs a correcting signal Dh to the error signal correcting section 11.

The error signal correcting section 11 makes a calculation of Dout0−Dh with the input N-valued signal Dout0 and the correcting signal Dh and outputs the corrected N-valued signal Dout1.

The predetermined gradation setting value storage section 14 has an A-ink predetermined gradation table 141 shown in FIG. 3A and a B-ink predetermined gradation table 142 shown in FIG. 3B. Each of the tables 141 and 142 is set with a predetermined gradation TJ which causes a tone jumps in accordance with the kind of recording medium, i.e., "plain paper", "dedicated paper", "glossy paper" and image resolution, i.e., "150 dpi", "300 dpi", "600 dpi". For example, assume that the ink A is used. In a case of image resolution of 300 dpi, the predetermined gradation TJ is "2" for the plain paper; "4" for the dedicated paper; and "5" for the glossy paper. Note that, the maximum gradation for the image resolution 150 dpi is "15"; for the image resolution 300 dpi, "7"; and for the image resolution 600 dpi, "3".

The predetermined gradation setting value storage section 14 reads out the predetermined gradation TJ in accordance with an ink specifying signal, recording medium specifying signal and image resolution specifying signal, which are inputted from external and supplies the read gradation TJ to the correcting signal generating section 13. In a case of specifying the ink A, the glossy paper as a recording medium and the 300 dpi as an image resolution, the predetermined gradation TJ of "5" is to be read.

With the structure described above, the tone jump correcting processing section 5 sets the predetermined TJ in accordance with the kind of ink, kind of medium and image resolution. When there is a gradation that H causes the tone jump immediately above or on the left side of the remarked pixel X and the remarked pixel X is in the gradation that causes the tone jump, correction can be carried out with the correcting signal Dh so as to prevent dots from associating with each other.

Figures 11, 12:
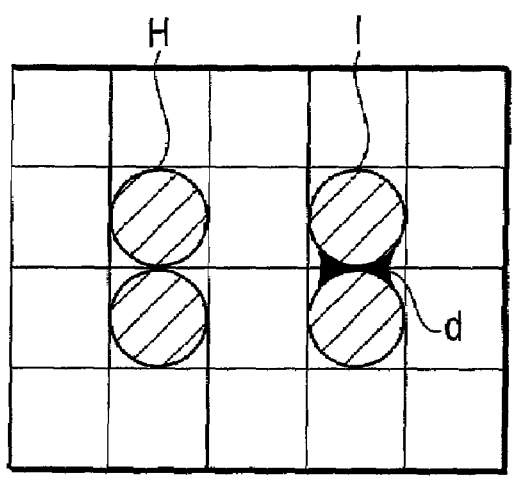
FIG. 11 is a diagram for explaining a difference between a practical dot in each gradation and a logical dot in a case where an eight-valued image is recorded with use of an ink jet printer.
FIG. 12 is a diagram for explaining a tone jump phenomenon that is caused when an image is recorded with use of an ink jet printer.

FIG. 4 is a flow chart showing a correcting processing which the tone jump correcting processing section 5 carries out. First of all, in a step S11, the tone jump correcting processing section 5 reads out the predetermined gradation TJ from the predetermined gradation setting value storage section 14 in accordance with the ink specifying signal, recording medium specifying signal and image resolution specifying signal, which are input from external, and sets the gradation TJ. For example, the ink A, glossy paper and resolution of 300 dpi are specified, and then the predetermined gradation TJ=5 is set. More specifically, there is ink to be used is oil pigment ink that is made by dispersing pigment in oil based solvent, and the ink has 10 mm Pa·s of viscosity at room temperature. In a case of performing print on a commercial glossy paper for ink jet recording at the resolution of 300 dpi with use of the ink described above, the predetermined gradation TJ=5 is set. Note that, when the predetermined gradation is set "5" under the above conditions, dot recording is carried out in advance for each gradation in the recording medium, and then a dot diameter of the printed image is measured. A value of the dot diameter, which is the closest to a theoretical value of resolution, is assumed as the predetermined gradation TJ which causes the tone jump. The gradation TJ becomes "5". That is, as shown in FIG. 11, assuming that a dot diameter in the gradation i is D(i) and one side length of a rectangle, which is given by assuming that a pixel in some resolution has a rectangular shape according to the theory, is A, the gradation may only be set to satisfy A−D≈0. Accordingly, in this case, the predetermined gradation is set at "5".

Next, in a step S12, the N-valued signal Dout0 is input. Then, in a step S13, the correcting signal generating section 13 determines whether or not the gradation of the N-valued signal Dout0 coincides with the predetermined gradation TJ. When the gradation of the N-valued signal Dout0 coincides with the predetermined gradation TJ, the correcting signal generating section 13 inputs the pixel L on the left side of the remarked pixel X (=Din0) and the pixel U immediately above the pixel X from the corrected N-valued signal storage section 12 in a step S14. When the gradation of the N-valued signal Dout0 does not coincide with the predetermined gradation TJ, the correcting signal generating section 13 specifies the correcting value Dh to be at "0" in a step S15.

In the step S14, the surrounding pixels L and U are input. Subsequently, in a step S16, it is determined whether or not the gradations of the surrounding pixels L and U coincide with the predetermined gradation TJ. When it is found that U≠TJ and L≠TJ, the correcting signal generating section 13 specifies the correcting value Dh to be at "0" in a step S15. When either of the gradations in the surrounding pixels L and U coincides with the predetermined gradation TJ, the correcting signal generating section 13 specifies the correcting value Dh to be at "1" in a step S17.

After completion of setting the correcting value in the step S15 or step S17 in the manner described above, the N-valued signal Dout1 which has prevented the tone jump by correcting the N-valued signal Dout0 is found with use of the correcting value Dh in a step S18, that is, calculation of Dout1=Dout0−Dh is carried out.

Accordingly, when the gradation of the remarked pixel X (=Din0) is "5" and either gradation of the surrounding pixel L or U is "5", the gradation of the remarked pixel X is set at "4" by reducing one level. When the gradation of the remarked pixel X (=Din0) is a value except for the gradation of 5, or when neither gradation of the surrounding pixels L nor U is "5" even the gradation of the remarked pixel X (=Din0) is "5", the gradation of the remarked pixel X is not changed.

When the N-valued signal Dout1 is obtained in this manner, the N-valued signal Dout1 with the tone jump prevented is lastly output in a step S19.

In such a structure, the M-valued input image signal Din0 is input into the input image signal correcting section 1. The input image signal correcting section 1 adds the remarked pixel accumulating error Es supplied from the accumulating error storage section 2 to the input image signal Din0 and outputs corrected image signal Din1. And then the corrected image signal Din1 is compared to the threshold T(i) supplied from the threshold value generating device 4 in the comparator 3 and converted into the N-valued signal Dout0.

The N-valued signal Dout0 is input into the tone jump correcting processing section 5. It is determined whether or not the gradation of the N-valued signal Dout0 coincides with the predetermined gradation TJ. When the gradation of the N-valued signal Dout0 is coincident with the predetermined gradation TJ, subsequently, it is determined whether or not the gradation of the pixel L on the left side of the remarked pixel X which is stored in the corrected N-valued signal storage section 12 with the tone jump prevented and the gradation of the pixel U immediately above the remarked pixel X are coincide with the predetermined gradation TJ. When either of the pixels L or U is coincide with the predetermined gradation TJ, the tone jump correcting processing section 5 specified the correcting value Dh to be "1", and outputs the corrected N-valued signal Dout1 obtained by reducing one level of gradation in the N-valued signal Dout0.

The corrected N-valued signal Dout1 is supplied to the N-valued error calculating section 6. The N-valued error calculating section 6 calculates the difference between the corrected image signal Din1 and the value of the N-valued signal Dout1 which is converted into the input image signal level. Then the N-valued error Er with the tone jump prevented is supplied to the diffusion error calculating section 7 and used for a succeeding error diffusion process.

In the manner described above, when the dot in the remarked pixel, the dot in the pixel on the left side of the remarked pixel and the dot in the pixel immediately above the remarked pixel are associated with one another so that the entire area of the associated dot increases, the tone jump is likely to occur. In this case, the tone jump can be prevented by reducing the gradation of the remarked pixel by one level. In addition, the corrected N-valued signal Dout1 with the tone jump prevented is supplied to the N-valued error calculating section 6 and used for a succeeding process. Therefore, the corrected N-valued signal Dout1 is a signal to which an error diffusion process has been performed. Accordingly, the image formed from the corrected N-valued signal Dout1 that is the converted multivalued image data is an image preserving the average density. That is, the average density after conversion into the multivalued image data can be preserved.

In addition, the predetermined gradation TJ is read out from the predetermined gradation setting value storage section 14 in accordance with the kind of the ink, kind of the recording medium and image resolution. Thus the tone jump can be prevented properly through the ink to be used, the recording medium to be used and the image resolution. That is, even the gradation in which the tone jump occurs is changed, it can be handled through the relation among the kind of ink, the kind of recording medium and the image resolution.

The invention has been described with the embodiment in that the correction to prevent the tone jump from occurring is achieved by reducing one level of the gradation. However, the invention is not limited to the case above. The correction to prevent the tone jump may be achieved by increasing one level of the gradation.

The method for the error diffusion processing is not limited to the case described in the above embodiment. However, another method for the error diffusion processing may be applicable. Furthermore, the input image signal is not limited to black and white one, but a colored input image signal is applicable. In this case, it can be realized by preparing a lookup table for each color signal of Y(Yellow), M(Magenta) and C(Cyan), and carrying out the same processing as one in the embodiment.

(Second Embodiment)

In this embodiment, an image processing method will be described in that an input image signal of M-gradations is processed by a dither processing and converted into an image signal of N-gradations (M>N>2).

Figure 5:
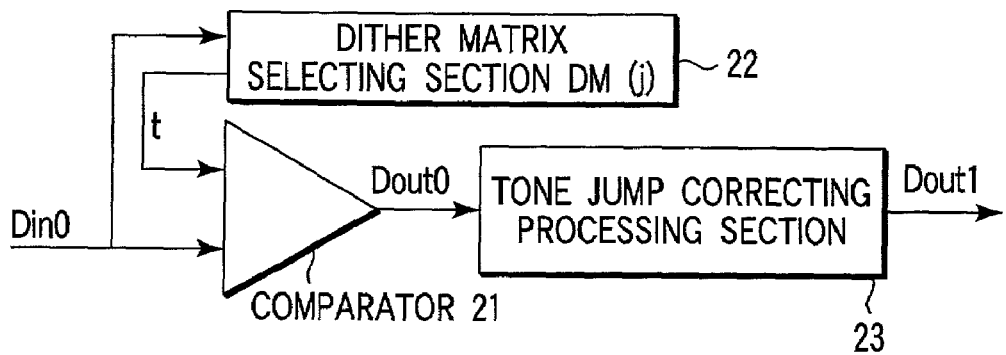
FIG. 5 is a block diagram showing a second embodiment according to the invention.
Figure 6:
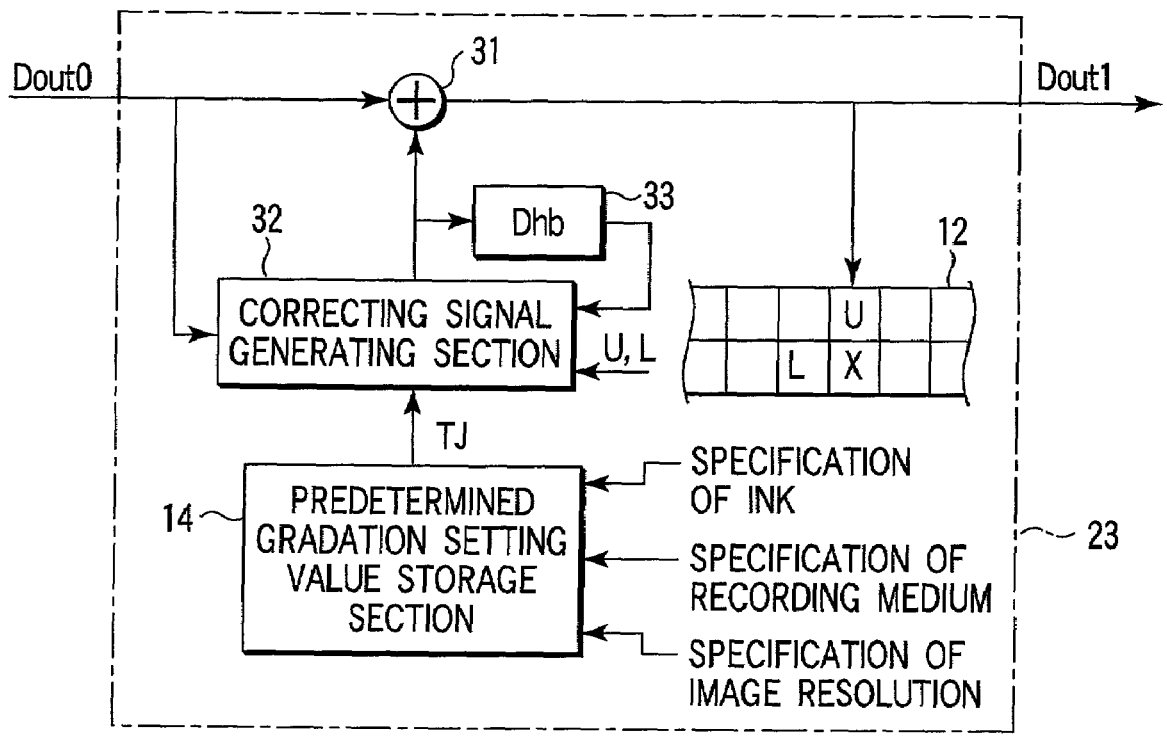
FIG. 6 is a block diagram showing a construction of the tone jump correction processing section according to the second embodiment.

FIG. 5 is a block diagram showing the entire structure. The input image signal Din0 of M-gradations is supplied to a comparator 21 and a dither matrix selecting section 22. The dither matrix selecting section 22 selects a dither matrix DM (j) in accordance with the input image signal Din0 and supplies a threshold t at a predetermined position to the comparator 21. Note that j is a natural number satisfying $1 \leq j < N$.

The comparator 21 compares the input image signal Din0 with the threshold t based on the dither matrix DM (j) and outputs a N-valued signal Dout0. In this case, the comparator 21 outputs Dout0=j in a case of Din0≧t; and Dout0=(j−1), Din0<t, in accordance with the selected dither matrix DM (j). The comparator 21 supplies the N-valued signal Dout0 to a tone jump correcting processing section 23. Then the tone jump correcting processing section 23 outputs an N-valued signal Dout1 with the tone jump prevented while preserving the average density.

The basics of the dither processing now will be described. Assume that an input image signal has H pixels in its one side as shown in FIG. 7A. The input image signal is compared to dither matrix thresholds of h×h (provided that h is a natural number satisfying H>h>2), for example, dither matrix thresholds of 4×4 shown in FIG. 7B. When the input image signal is larger than the dither matrix threshold, "1" is outputted; and the input image signal is smaller, "0" is outputted. Thus a binary output image signal as shown in FIG. 7C is obtained. Then, N-valuing processing can be performed with (N−1) pieces of such dither matrix thresholds.

The tone jump correcting processing section 23 has an error signal correcting section 31 into which the N-valued signal Dout0 supplied from the comparator 21 is input, and the corrected N-valued signal storage section 12 that stores the corrected N-valued signal Dout1 from which the tone jump has been prevented.

In addition, the tone jump correcting processing section 23 is provided with a correcting signal generating section 32, a preceding correcting processing storage section 33 and the predetermined gradation setting value storage section 14. On receiving a N-valued remarked pixel X (=Din0), a pixel L on the left side of the remarked pixel X stored in the corrected N-valued signal storage section 12 and a pixel U immediately above the remarked pixel X, the correcting signal generating section 32 compares the respective pixels with a predetermined gradation TJ which is read out from the predetermined gradation setting value storage 14, which causes the tone jump. Then the correcting signal generating section 32 outputs a correcting signal Dh to the error signal correcting section 31 with reference to a preceding correcting signal Dhb stored in the preceding correcting processing storage section 33. And then the preceding correcting processing storage section 33 stores the recent correcting signal Dh as a preceding correcting signal Dhb.

The error signal correcting section 31 makes a calculation of Dout0+Dh with the input N-valued signal Dout0 and the correcting signal Dh and outputs the corrected N-valued signal Dout1.

Figure 8:
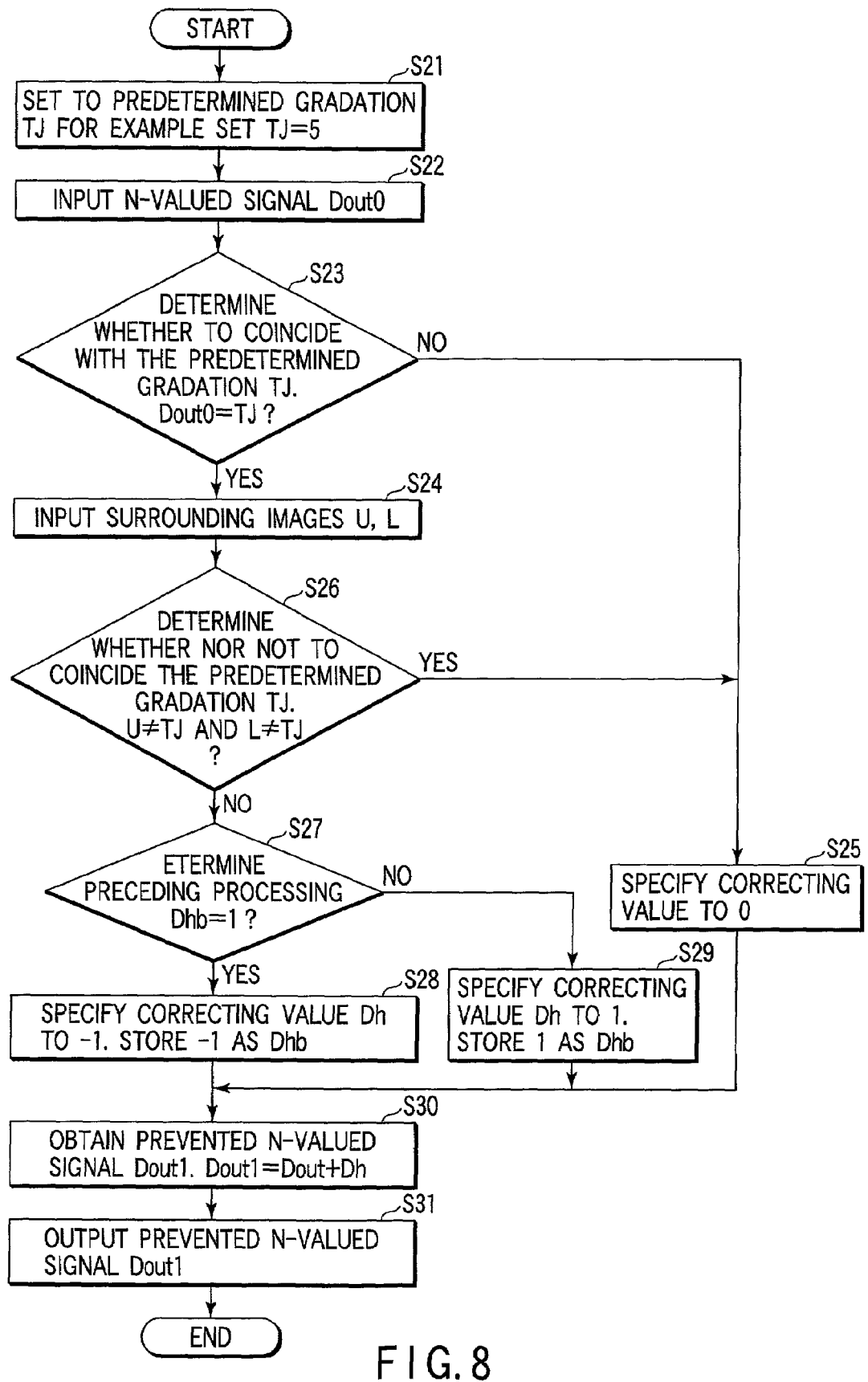
FIG. 8 is a flow chart showing processes in tone jump correction processing section according to the second embodiment.

FIG. 8 is a flow chart showing a correcting processing which the tone jump correcting processing section 23 performs. First of all, in a step S21, the tone jump correcting processing section 23 reads out the predetermined gradation TJ from the predetermined gradation setting value storage section 14 in accordance with the ink specifying signal, recording medium specifying signal and image resolution specifying signal, which are input from external, and sets the gradation TJ. For example, ink A, glossy paper and resolution of 300 dpi are specified, and then the predetermined gradation TJ=5 is set.

Next, in a step S22, the N-valued signal Dout0 is input. Then, in a step S23, the correcting signal generating section 32 determines whether or not the gradation of the N-valued signal Dout0 coincides with the predetermined gradation TJ. When the gradation of the N-valued signal Dout0 coincides with the predetermined gradation TJ, the correcting signal generating section 32 inputs the pixel L on the left side of the remarked pixel X (=Din0) and the pixel U immediately above the pixel X from the corrected N-valued signal storage section 12 in a step S24. When the gradation of the N-valued signal Dout0 does not coincide with the predetermined gradation TJ, the correcting signal generating section 32 specifies the correcting value Dh to be "0" in a step S25.

In the step S24, the surrounding pixels L and U are input. Subsequently, in a step S26, it is determined whether or not the gradations of the surrounding pixels L and U coincide with the predetermined gradation TJ. When it is found that U≠TJ and L≠TJ, the correcting signal generating section 32 specifies the correcting value Dh to be "0" in a step S25. When either of the gradations in the surrounding pixels L and U coincides with the predetermined gradation TJ, it is determined whether or not the preceding correcting signal Dhb stored in the preceding correcting processing storage section 33 is "1".

When the Dhb=1 is found, in a step S28, the tone jump correcting processing section 23 specifies the correcting value Dh to "−1". Then the tone jump correcting processing section 23 supplies the specified correcting value Dh to the error signal correcting section 31 and stores the correcting value as a preceding correcting signal Dhb in the preceding correction processing storage section 33.

When the Dhb ≠1 is found, in a step S29, the section 23 specifies the correcting value Dh to "1". Then, the section 23 supplies the value Dh to the error signal correcting section 31 and stores the value as a preceding correcting signal Dhb in the section 33.

After completion of setting the correcting value in the step S25, step S28 or step S29 in the manner described above, the N-valued signal Dout1 with the tone jump prevented by correcting the N-valued signal Dout0 is found with use of the correcting value Dh in a step S30. That is, calculation of Dout1=Dout0+Dh is carried out.

Accordingly, when the gradation of the remarked pixel X (=Din0) is "5", either gradation of the surrounding pixel L or U is "5" and the correcting value is "−1", the gradation of the remarked pixel X is set at "4" by reducing one level of its gradation. When the gradation of the remarked pixel X (=Din0) is "5", either gradation of the surrounding pixel L or U is "5" and the correcting value is "1", the gradation of the remarked pixel X is set at "6" by increasing one level of its gradation. Further, when the gradation of the remarked pixel X (=Din0) is at a level except for the gradation of 5, or when neither gradation of the surrounding pixels L nor U is "5" even the gradation of the remarked pixel X (=Din0) is "5", the gradation of the remarked pixel X is not changed.

When the N-valued signal Dout1 is obtained in this manner, the N-valued signal Dout1 with the tone jump prevented is lastly output in a step S31.

In such a structure, the M-gradation input image signal Din0 is input into the comparator 21. In the comparator 21, the input image signal Din0 is compared with a threshold of the dither matrix DM (j) supplied from the dither matrix selecting section 22 and converted into the dither-processed N-valued signal Dout0.

The N-valued signal Dout0 is input into the tone jump correcting processing section 23. It is determined whether or not the gradation of the N-valued signal Dout0 coincides with the predetermined gradation TJ. When the gradation of the N-valued signal Dout0 is coincident with the predetermined gradation TJ, it is determined whether or not the gradation of the pixel L on the left side of the remarked pixel X which is stored in the corrected N-valued signal storage section 12 with the tone jump prevented and the gradation of the pixel U immediately above the remarked pixel X are coincide with the predetermined gradation TJ. When either of the pixels L or U is coincide with the predetermined gradation TJ, the tone jump correcting processing section 23 specified the correcting value Dh to be "−1" or "1". That is, when the preceding correcting value Dh is "1", the correcting value Dh=−1 is specified. When the preceding correcting value Dh is "−1", the correcting value Dh=1 is specified.

When the correcting value Dh=−1 is specified, the error signal correcting section 31 outputs the corrected N-valued signal Dout1 obtained by reducing one level of gradation from the N-valued signal Dout0. When the correcting value Dh=1 is specified, the error signal correcting section 31 outputs the corrected N-valued signal Dout1 obtained by increasing one level of gradation in the N-valued signal Dout0. The output corrected N-valued signal Dout1 is stored in the corrected N-valued signal storage section 12.

In the manner described above, when the dot in the remarked pixel, the dot in the pixel on the left side of the remarked pixel and the dot in the pixel immediately above the remarked pixel are associated with one another so that the entire area of the associated dot increases, the tone jump is likely to occur. In this case, the tone jump can be prevented by reducing or increasing the gradation of the remarked pixel by one level. Moreover, in order to change the gradation of the remarked pixel, when the preceding correcting value is "1", the gradation of the remarked pixel is reduced by one level, and when the preceding correcting value is at "−1", the gradation of the remarked pixel is increased by one level. Accordingly, the image formed from the corrected N-valued signal Dout1 is an image preserving the average density. That is, the average density after conversion into the multivalued image data can be preserved.

In addition, the predetermined gradation TJ is read out from the predetermined gradation setting value storage section 14 in accordance with the kind of the ink, kind of the recording medium and image resolution. Thus the tone jump can be prevented properly through the ink to be used, the recording medium to be used and the image resolution. That is, even the gradation in which the tone jump occurs is changed, it can be handled through the relation among the kind of ink, the kind of recording medium and the image resolution.

Note that the method of dither processing is not limited to one described in the embodiment. The invention can be applied to a case where the dither processing is performed by the other method. Furthermore, the color of the input image signal is not limited to black and white, but color signal may be acceptable. In this case, it can be realized by preparing a lookup table for each color signal of Y(Yellow), M(Magenta) and C(Cyan) and carrying out the same processing as one in the embodiment.

Figures 9, 10:
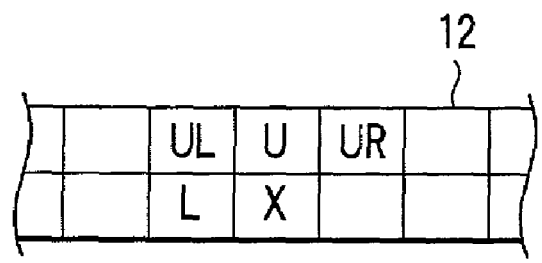
FIG. 9 is a diagram for explaining another example of a pixel in a corrected N-valued signal storage section, which a correcting signal generating section compares with a predetermined gradation.
FIG. 10 is a diagram showing another construction example of the predetermined gradation setting value storage section.

In each of the embodiments described above, the correcting signal generating section reads out a pixel L on the left side of the remarked pixel X and a pixel U immediately above the remarked pixel X from the corrected N-valued signal storage section 12 and compares their gradation with the predetermined gradation TJ. However, it is not necessary to limit to the case above. For example, as shown in FIG. 9, the correcting value may be read out as follows. A pixel L on the left side of the remarked pixel X, a pixel U immediately above the remarked pixel X, a pixel UL on the diagonally upper left side of the remarked pixel X and a pixel UR on the diagonally upper right side of the remarked pixel X are read out from the corrected N-valued signal storage section 12. Then the correcting value corresponding to a lookup table is read out with combination of gradations in the respective pixels L, U, UL and UR.

In addition, in each of the embodiments described above, the predetermined gradation table is selected as the predetermined gradation setting value storage section in accordance with the kind of ink, and the predetermined gradation is set in accordance with the kind of recording media and image resolution. However, in a case where the kind of ink is specified, it is also applicable that only one predetermined gradation table is provided as shown in FIG. 10, and the predetermined gradation is set in accordance with the kind of recording media and image resolution.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method comprising:
   converting image data of M-gradations in a pixel into multivalued image data of N-gradations (M>N>2) in a pixel;
   setting a gradation value at which a practical dot size diameter is equivalent to a theoretical square pixel dimension, as a predetermined gradation TJ (N>TJ>2) which causes a tone jump;
   determining whether a gradation of a remarked pixel converted into the multivalued image data is the predetermined gradation TJ;
   determining, when the gradation of the remarked pixel converted into the multivalued image data is determined to be the predetermined gradation TJ, whether a pixel of the predetermined gradation TJ exists in pixels located adjacent to the remarked pixel;
   changing the gradation of the remarked pixel to a gradation other than the predetermined gradation so as to avert the tone jump when the pixel of the predetermined gradation TJ exists in the pixels located adjacent to the remarked pixel; and
   storing an average density after multivalued image data conversion.

2. The method according to claim 1, wherein the image data off M-gradations in a pixel is converted into the multivalued image data of N-gradations (M>N>2) in a pixel by an error diffusion method.

3. The method according to claim 1, wherein the image data of M-gradations in a pixel is converted into the multivalued image data of N-gradations (M>N>2) in a pixel by a dither method.

4. The method according to claim 2, wherein the average density after multivalued image data conversion is stored by performing the error diffusion method in accordance with the gradation other than the predetermined gradation converted to prevent the tone jump.

5. The method according to claim 4, wherein when a pixel of the predetermined gradation TJ exists in the pixels located adjacent to the remarked pixel, the gradation of the remarked pixel is reduced by one level so as to prevent the tone jump.

6. The method according to claim 4, wherein when a pixel of the predetermined gradation TJ exists in the pixels located adjacent to the remarked pixel, the gradation of the remarked pixel is increased by one level so as to prevent the tone jump.

7. The method according to claim 4, wherein assuming that a dot diameter of a pixel in a gradation i is D(i), and one side length of a rectangle which is given by assuming that a pixel in some resolution has a theoretical rectangular shape is A, the predetermined gradation TJ is set to a gradation that satisfies A−D(i)≈0.

8. The method according to claim 4, wherein predetermined gradations TJ in which a tone jump occurs are set in a storage section independently in accordance with a kind of recording medium and image resolution, and a corresponding one of the predetermined gradations is read out from the storage section in accordance with specification of the kind of recording medium and specification of the image resolution, and is set.

9. The method according to claim 4, wherein predetermined gradations TJ in which a tone jump occurs are set in a storage section independently in accordance with a kind of ink, a kind of recording medium and image resolution, and a corresponding one of the predetermined gradations is read out from the storage section in accordance with specification of the kind of ink, specification of the kind of recording medium and specification of the image resolution, and is set.

10. The method according to claim 3, wherein the gradation other than the predetermined gradation changed so as to prevent the tone jump is repeatedly increased and reduced alternately so as to store an average density thereof.

11. The method according to claim 10, wherein when a pixel of the predetermined gradation TJ exists in the pixels located adjacent to the remarked pixel, a gradation of the remarked pixel is reduced by one level so as to prevent a tone jump.

12. The method according to claim 10, wherein when a pixel of the predetermined gradation TJ exists in the pixels located adjacent to the remarked pixel, a gradation of the remarked pixel is increased by one level so as to prevent a tone jump.

13. The method according to claim 10, wherein assuming that a dot diameter of a pixel in a gradation i is D(i), and one side length of a rectangle which is given by assuming that a pixel in some resolution has a theoretical rectangular shape is A, the predetermined gradation TJ is set to a gradation that satisfies A−D(i)≈0.

14. The method according to claim 10, wherein predetermined gradations TJ in which a tone jump occurs are set in a storage section independently in accordance with a kind of recording medium and image resolution, and a corresponding one of the predetermined gradations is read out from the storage section in accordance with specification of the kind of recording medium and specification of the image resolution, and is set.

15. The method according to claim 10, wherein predetermined gradations TJ in which a tone jump occurs are set in a storage section independently in accordance with a kind of ink, a kind of recording medium and image resolution, and a corresponding one of the predetermined gradations is read out from the storage section in accordance with specification of the kind of ink, specification of the kind of recording medium and specification of the image resolution, and is set.

16. An image processing apparatus comprising:
- means for converting image data of M-gradations in a pixel into multivalued image data of N-gradations (M>N>2) in a pixel by an error diffusion method;
- means for setting a gradation value at which a practical dot size diameter is equivalent to a theoretical square pixel dimension, as a predetermined gradation TJ (N>TJ>2) which causes a tone jump;
- means for determining whether a gradation of a remarked pixel converted into the multivalued image data is the predetermined gradation TJ;
- means for determining, when the gradation of the remarked pixel converted into the multivalued image data is determined to be the predetermined gradation TJ, whether a pixel of the predetermined gradation TJ exists in pixels located adjacent to the remarked pixel;
- means for changing the gradation of the remarked pixel to a gradation other than the predetermined gradation so as to avert the tone jump when the pixel of the predetermined gradation TJ exists in the pixels located adjacent to the remarked pixel; and
- means for performing the error diffusion method based on the gradation other than the predetermined gradation changed to prevent the tone jump so as to store an average density after multivalued image data conversion.

17. An image processing apparatus comprising:
- means for converting image data of M-gradations in a pixel into multivalued image data of N-gradations (M>N>2) in a pixel by a dither method;
- means for setting a gradation value at which a practical dot size diameter is equivalent to a theoretical square pixel dimension, as a predetermined gradation TJ (N>TJ>2) which causes a tone jump;
- means for determining whether a gradation of a remarked pixel converted into the multivalued image data is the predetermined gradation TJ;
- means for determining, when the gradation of the remarked pixel converted into the multivalued image data is determined to be the predetermined gradation TJ, whether a pixel of the predetermined gradation TJ exists in pixels located adjacent to the remarked pixel;
- means for changing the gradation of the remarked pixel to a gradation other than the predetermined gradation so as to avert a tone jump when the pixel of the predetermined gradation TJ exists in the pixels located adjacent to the remarked pixel; and
- means for repeatedly alternately increasing and reducing a gradation other than the predetermined gradation changed to prevent the tone jump so as to store an average density thereof.

* * * * *